(12) United States Patent
Shibuya et al.

(10) Patent No.: US 7,551,690 B2
(45) Date of Patent: Jun. 23, 2009

(54) TRANSMITTER AND RECEIVER

(75) Inventors: Takako Shibuya, Kobe (JP); Tomohisa Tanaka, Kobe (JP)

(73) Assignee: TOA Corporation, Kobe-shi, Hyogo (JP)

( * ) Notice: Subject to any disclaimer, the term of this patent is extended or adjusted under 35 U.S.C. 154(b) by 620 days.

(21) Appl. No.: 10/467,847

(22) PCT Filed: Feb. 25, 2002

(86) PCT No.: PCT/JP02/01682

§ 371 (c)(1),
(2), (4) Date: Aug. 13, 2003

(87) PCT Pub. No.: WO02/069546

PCT Pub. Date: Sep. 6, 2002

(65) Prior Publication Data

US 2004/0063407 A1    Apr. 1, 2004

(30) Foreign Application Priority Data

Feb. 27, 2001   (JP) .............................. 2001-052579

(51) Int. Cl.
*H03K 9/00* (2006.01)

(52) U.S. Cl. .................... 375/316; 375/224; 375/227; 714/804; 714/758; 370/474; 370/537

(58) Field of Classification Search ................. 375/242, 375/316, 224, 227; 341/126; 714/758, 804; 370/474, 537
See application file for complete search history.

(56) References Cited

U.S. PATENT DOCUMENTS

| 4,766,596 | A | * | 8/1988 | Michels-Krohn et al. ... 714/815 |
|---|---|---|---|---|
| 4,827,489 | A | * | 5/1989 | Doi et al. ..................... 375/341 |
| 5,581,651 | A | * | 12/1996 | Ishino et al. ................. 704/205 |
| 5,606,370 | A | * | 2/1997 | Moon ..................... 375/240.23 |
| 5,867,538 | A | * | 2/1999 | Liu .............................. 375/341 |
| 5,875,279 | A | * | 2/1999 | Owashi et al. ................. 386/46 |
| 6,029,264 | A | * | 2/2000 | Kobayashi et al. .......... 714/755 |
| 6,170,073 | B1 | * | 1/2001 | Jarvinen et al. ............. 714/758 |
| 6,201,902 | B1 | * | 3/2001 | Sasaki et al. ................ 382/309 |
| 6,686,879 | B2 | * | 2/2004 | Shattil ........................ 342/367 |
| 2002/0108090 | A1 | * | 8/2002 | Ariel et al. .................. 714/792 |

(Continued)

FOREIGN PATENT DOCUMENTS

JP    61-041241    2/1986

(Continued)

*Primary Examiner*—Chieh M. Fan
*Assistant Examiner*—Eva Puente
(74) *Attorney, Agent, or Firm*—Duane Morris LLP

(57) ABSTRACT

A transmitter (1) converts an input signal from a microphone (2) into a plural-bit digital signal by means of an A/D converter (4) at predetermined time intervals. An encoder (6) divides the digital signal into plural blocks and adds a parity bit to each block to thereby form a coded signal. A transmitting unit (8) modulates a carrier with the coded signal and transmits the modulated carrier through an antenna (10). A receiver (12) includes two tuning units (18A, 18B). Corresponding coded signals outputted from the tuning units (18A, 18B) are inputted to a decoder (20). The decoder (20) makes a parity check on respective blocks of the corresponding coded signals and selects and outputs an error-free one of the corresponding blocks of the corresponding coded signals.

2 Claims, 6 Drawing Sheets

U.S. PATENT DOCUMENTS

| | | | |
|---|---|---|---|
| 2002/0141520 A1* | 10/2002 | Nigrin et al. | 375/347 |
| 2002/0163904 A1* | 11/2002 | Rao et al. | 370/347 |
| 2003/0048834 A1* | 3/2003 | Feher | 375/219 |
| 2003/0084398 A1* | 5/2003 | Nguyen | 714/786 |
| 2003/0129999 A1* | 7/2003 | Ikeda et al. | 455/502 |
| 2004/0001561 A1* | 1/2004 | Dent et al. | 375/308 |
| 2004/0042537 A1* | 3/2004 | Frank | 375/152 |
| 2007/0098103 A1* | 5/2007 | Murakami et al. | 375/267 |

FOREIGN PATENT DOCUMENTS

| | | |
|---|---|---|
| JP | 61-140225 | 6/1986 |
| JP | 63-290033 | 11/1988 |
| JP | 02-213234 | 8/1990 |
| JP | 03-266545 | 11/1991 |
| JP | 04-243068 | 8/1992 |
| JP | 06-309812 | 11/1994 |
| JP | 07-111499 | 4/1995 |
| JP | 2000-101521 | 4/2000 |
| JP | 2001-136155 | 5/2001 |

* cited by examiner

Fig. 5a

| D15 | D14 | D13 | D12 | D11 | D10 | D9 | D8 | D7 | D6 | D5 | D4 | D3 | D2 | D1 | D0 |

Fig. 5b

| D15 | D14 | D13 | D12 | D11 | D10 | D9 | D8 | D7 | D6 | D5 | D4 | D3 | D2 | D1 | D0 |

Fig. 5c

| D15 | D14 | D13 | D12 | D11 | D10 | D9 | D8 | D7 | D6 | D5 | D4 | D3 | D2 | D1 | D0 |

Fig. 5d

| D15 | D14 | D13 | D12 | D11 | D10 | D9 | D8 | D7 | D6 | D5 | D4 | D3 | D2 | D1 | D0 |

TRANSMITTER AND RECEIVER

TECHNICAL FIELD

The present invention relates to a transmitter and a receiver and, more particularly, to a digital transmitter and a digital receiver which are provided with measures against transmission error.

BACKGROUND

In a digital wireless transmission and reception system, a transmitter transmits a modulated signal comprising a carrier modulated with digital data having "1" or "0" level, while a receiver receives the modulated signal and recovers the digital data from the received signal. Being affected by noise or the like in the radio transmission path between the transmitter and the receiver, it may occur that the "1" or "0" level data cannot properly be recovered to have "1" or "0" level.

One technique for examining whether or not there is any such error is the RSSI system. According to this system, the reception level is examined at a receiver to find out portions of digital data which may contain error. Another technique is to add, at a transmitter, an error detection code to each sample or each frame of digital data before transmission and judge whether or not erroneous transmission has been done, based on the error detection code. One sample is, when an audio signal, for example, is transmitted, a digital signal with a predetermined number of bits which results from sampling the audio signal at a predetermined sampling frequency and converting each of the resulting sampling values in an analog-to-digital (A/D) converter. One frame is a plurality of such digital signals combined into a lump of data. Also, a technique has been developed, according to which an error detection code is added at the transmitter and error correction is done at the receiver.

However, the RSSI system can only approximately specify portions which may contain error.

When error detection codes are used to detect error, an error detection code is added to each sample or frame, and, therefore, if error is detected in an sample or frame, such sample or frame must be discarded. Even when portions of a sample or frame containing error are few, the whole sample or frame of data must be discarded. Even if only one sample or frame is discarded, particularly in a digitized audio signal, the sound is distorted large relative to small error in data.

A typical example of error correction technique is the BCH code technique, according to which redundant bits are added to information bits so as to make it possible to make correction to an extent determined by the correction ability. For example, by adding three redundant bits to four information bits, the correction ability of one bit is provided. In this case, if error exceeding the correction ability occurs, inappropriate correction is done, which results in large distortion. If it is desired to increase the correction ability in order to avoid inappropriate correction, the number of redundant bits must be increases, which results in decrease of transmission efficiency. In particular, in wireless communication signals, error in successive bits, called burst error, may occur. Accordingly, in order to provide error correction by means of error correction codes, the correction ability must be increased relative to random error of the same error rate. As a result, more redundant bits must be added, which results in further reduction of transmission efficiency.

An object of the present invention is to provide a transmitter and receiver, which enables highly accurate error detection and reliable code error correction without introducing reduction of transmission efficiency.

DISCLOSURE OF THE INVENTION

A transmitter according to the present invention includes an A/D converter for converting an analog input signal to digital signals having a plurality of bits. The digital signals occur successively at predetermined sampling intervals. Encoding means of the transmitter divides the digital signal into a plurality of blocks and adds a parity bit to each of the blocks, to thereby generate a coded signal. The number of bits forming each block can be arbitrarily determined. For example, one block can be formed of one bit. Modulating means modulates a carrier with the coded signal before transmitting it. The modulating means can employ any of prior-art modulating techniques known for modulating digital signals.

A parity bit is a bit added to make the sum of "1" bits contained in data of plural bits and the added parity bit equal to a predetermined odd or even value. For example, in the even parity, if the number of "1" level bits in one data is odd, a parity bit of "1" is used. If the number of "1" level bits is even, a parity bit of "0" is used. In the odd parity, when the number of "1" level bits is an odd number, a parity bit of "0" is used, while, if the number of "1" level bits is even, a parity bit of "1" is used. When the even parity check is used, for example, the number of the "1" level bits, which may include the parity bit, is counted in the reception side, and, if the count is even, the data is judged to be free of error. If the count is odd, the data is judged to contain error.

If the number of bits to be checked for error is large, for example, if the entirety of one digital signal is to be checked for error, there is an increased possibility that, even though the check result indicates that there is no error, error actually is present. In other words, error detecting accuracy is low. This means that the number of bits to be examined for error should be small. According to the present invention, it is not one whole digital signal that is to be checked for error, but the digital signal is divided into plural blocks, and a parity is added to each block. Error check can be made for each block, and, therefore, the error detecting accuracy can be increased. A maximum detection accuracy can be realized when one block includes one bit. If error is detected and data is to be discarded, only blocks, which form only part of one digital signal, need be discarded.

When the analog input signal is an audio signal, the number of higher-order bits forming one block is preferably smaller than the number of lower-order bits for forming one block. For example, one higher-order bit may be used for forming one block while one lower-order bit block may be formed of a plurality of bits. When an audio signal is digitized, a higher-order bit, e.g. the most significant bit, may be used as a sign bit. If this bit is wrong, it gives large influence on the sound quality. Other higher-order bits, which represent a larger level portion of an audio signal, are considered. For example, in an 8-bit digital signal with the eighth bit (MSB) used as a sign bit, sixty-four (64) levels at the maximum can be represented by the first through seventh bits. The seventh bit can represent one-half, 32, of the maximum level 64. Thus, the sound quality largely depends on whether higher-order bits contain error or not. This is the reason why each of higher-order bits is individually examined whether or not it contains error.

It is preferable to format each parity bit with an associated block, with at least one parity bit positioned apart from its associated block.

Under some circumstances in the transmission path, error could occur collectively. In such cases, if respective blocks and associated parity bits are transmitted one following the other, error may occur both of them. As a result, the error may not be detected. In order to avoid it, blocks and associated parity bits are separated from each other, which results in improvement of detection accuracy.

A receiver according to the present invention includes a plurality of demodulating means for demodulating the coded signal from the modulated signal transmitted from the above-described transmitter. At least two demodulating means are provided. Each of the plural demodulating means inputs the coded signal, recovered from the transmitted modulated signal, to decoding means. The decoding means includes parity check means which performs parity check on respective blocks of the corresponding coded signals applied thereto, and includes first block selecting means which selects and outputs one of the corresponding blocks of the corresponding coded signals with less error, based on the result of the parity check.

With this arrangement, by performing parity check on mutually corresponding blocks, it is possible to know which one of the blocks contains error. If one block contains error, a block free of error is selected. Therefore, if a block contains error, such error can be corrected.

The decoding means may include second block selecting means, which, when corresponding blocks of corresponding ones of the plural coded signals contain no error, selects that one of the plural corresponding coded signals which has a lower error rate.

When it is judged that none of the corresponding blocks of the corresponding coded signals contain error, it is necessary to determine which one of such blocks should be selected. A block with error would be judged to be free of error due to its associated parity bit transmitted with error introduced into it. In such situation, it can be considered that a block of a coded signal with a smaller error rate has a higher possibility of containing no error. (The error rate is a rate that represents how many blocks in the blocks of the coded signal contain error.) According to the present invention, therefore, a block with a smaller coded signal error rate is selected in order to improve the reliability of the selected blocks.

The decoding means may include third block selecting means, which, when corresponding blocks of corresponding plural coded signals contain error, selects the corresponding block of the previously outputted coded signal.

When all of the corresponding blocks contain error, a block to be outputted in place of the error-containing blocks must be determined. In such situations, a corresponding block of the coded signal outputted before the current error containing coded signal is outputted. For example, when an audio signal is digitized, it seldom occurs that there is a large level difference between current and previous digital audio signals. Accordingly, the previous coded signal may be well substitutable. In addition, what is substituted for is not the entire coded signal, but is only the block containing error, and, therefore, influence of the substitution on the coded signal as a whole is small.

The decoding means may include coded signal selecting means, which, when the mutually corresponding coded signals are inputted thereto from the plural demodulating means, performs parity check on the respective blocks and selects the one of the coded signals that has a low error rate. In this case, the decoding means includes substituting means for substituting, for an error-containing block in the selected coded signal, a corresponding error-free block in other coded signal.

With this arrangement, a coded signal with a lower error rate is first selected from a plurality of coded signals, and blocks which are judged not to contain error are outputted as they are. Only those blocks containing error are replaced. Accordingly, in comparison with comparing corresponding blocks in a plurality of coded signals with each other, processing can be done at a higher rate.

The decoding means may include memory means for storing therein a previously outputted coded signal, and also reading means for outputting, when corresponding blocks in the plural coded signals all contain error, the corresponding block in the previously outputted coded signal.

With this arrangement, even when corresponding blocks in plural corresponding coded signals all contain error, the corresponding block in the previously outputted coded signal can be selected. When mutually corresponding blocks all contain error, the corresponding block in the coded signal outputted before that coded signal is outputted. For example, considering a signal resulting from digitizing an audio signal, it seldom happens that the level of the signal changes abruptly, and, therefore, the previous coded signal can be substituted satisfactorily. Furthermore, what is replaced is not the entire coded signal, but only the block containing error, the substitution can give little influence on the coded signal as a whole.

BRIEF DESCRIPTION OF THE DRAWINGS

FIGS. 5a through 5d are diagrams for use in explaining the decoding done by a decoder of the receiver of FIG. 1.

BEST MODE FOR EMBODYING THE INVENTION

Figure 1:
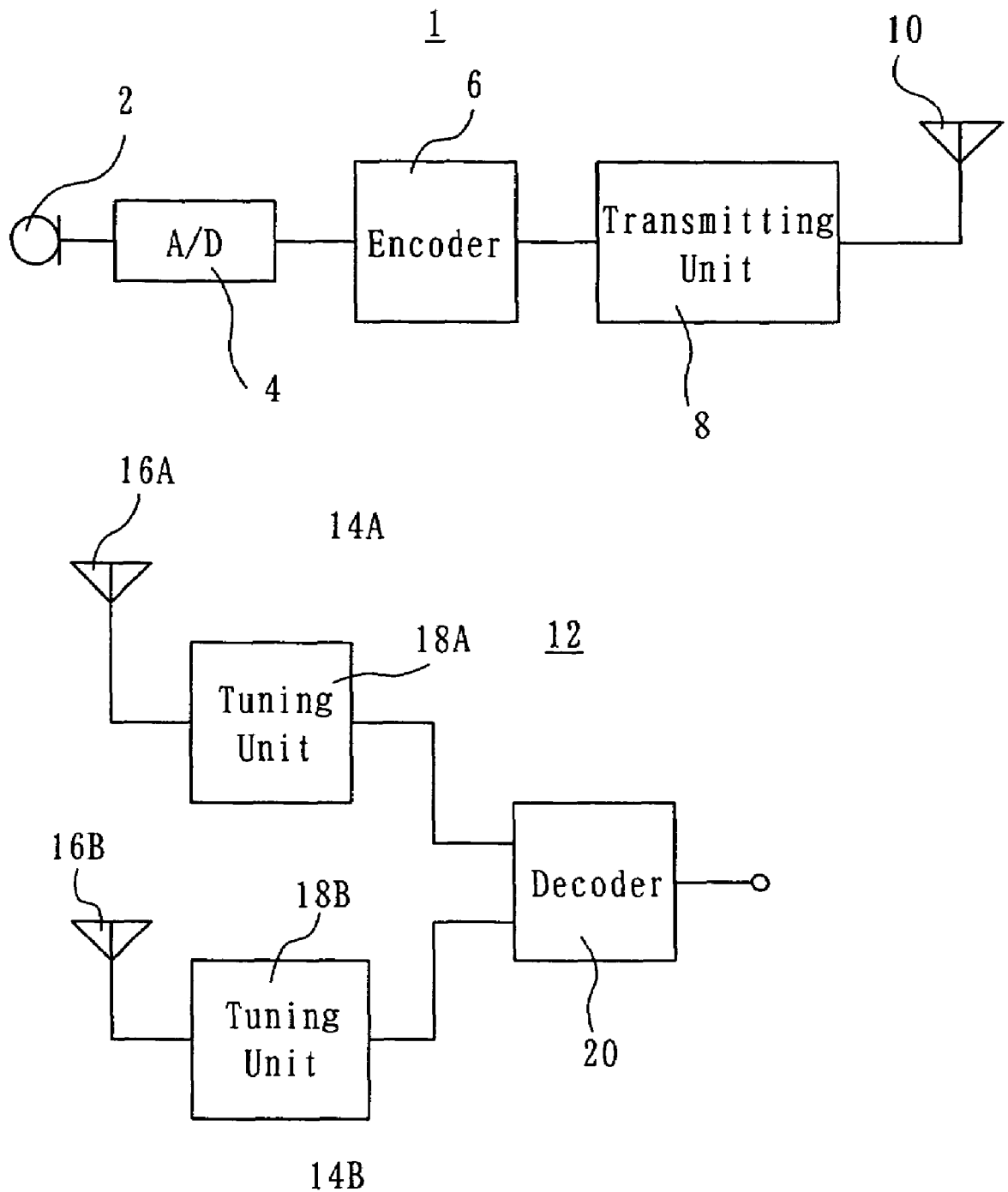
FIG. 1 is a block diagram of a transmitter and a receiver according to an embodiment of the present invention.

As shown in FIG. 1, a transmitter 1 according to an embodiment of the present invention includes an analog input signal source, e.g. a microphone 2. An audio signal picked up by the microphone 2 is applied to an A/D converter 4. The A/D converter 4 samples the audio signal at a predetermined sampling frequency and converts it into plural-bit, e.g. 16-bit, digital audio signals. The digital audio signals occur at intervals of the reciprocal of the sampling frequency. These digital audio signals are applied successively to an encoder 6 where they are converted to coded signals. Practically, the encoder 6 assembles a given number of such coded signals to form a frame. The frame configuration does not relate directly to the subject of the present invention, and, therefore, the following description of the invention is given, assuming that the coded signals are outputted from the encoder 6. The coded signals are coupled to a transmitting unit 8. A carrier is digitally modulated with the coded signals in a modulator of the transmitting unit 8, which results in a modulated signal. The modulated signal is amplified in an output section of the transmitting unit 8, and transmitted through an antenna 10.

The modulated signal transmitted from the antenna 10 is received by a receiver 12 according to an embodiment of the present invention. The receiver 12 includes plural, e.g. two, receiving units 14A and 14B, in plural paths A and B. The receiving unit 14A includes an antenna 16A and a tuning unit 18A. Similarly, the receiving unit 14B includes an antenna 16B and a tuning unit 18B. The modulated signal received at each of the antennas 16A and 16B is demodulated into the coded signals in demodulating means in the tuning units 18A and 18B, respectively.

In order to prevent large difference from occurring between the coded signals outputted by the tuning units 18A and 18B, the antennas 10, 16A and 16B are positioned in such a manner that the distance between the antennas 10 and 16A can be substantially equal to the distance between the antennas 10 and 16B. The positioning of the antennas 10, 16A and 16B is also determined so as to prevent multiple paths from being produced. For example, the antennas 10, 16A and 16B are disposed within a relatively small area of several tens of meters square, with no obstacles.

Mutually corresponding coded signals from the tuning units 18A and 18B are decoded in a decoder 20, then, converted into an analog audio signal in a digital-to-analog (D/A) converter (not shown), amplified in an amplifier (not shown), and emitted through a loudspeaker system (not shown).

Figures 2A, 2B, 2C:
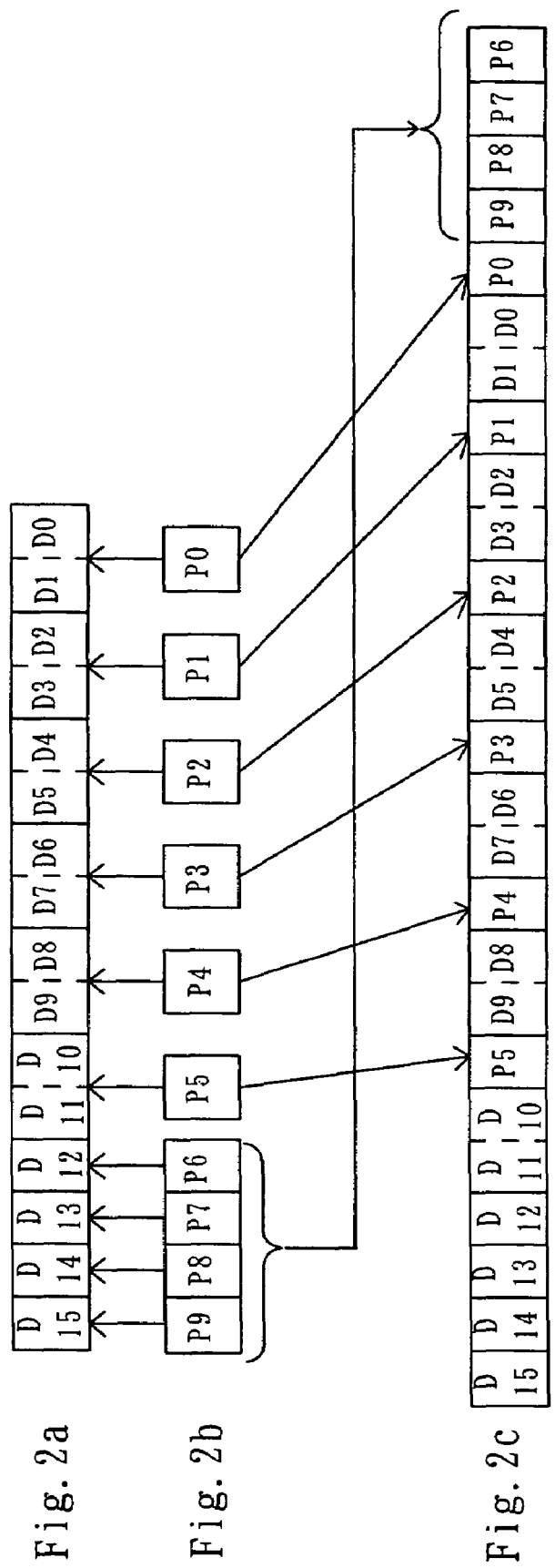
FIGS. 2a through 2c are diagrams for use in explaining the encoding done by an encoder in the transmitter shown in FIG. 1.
Figure 3:
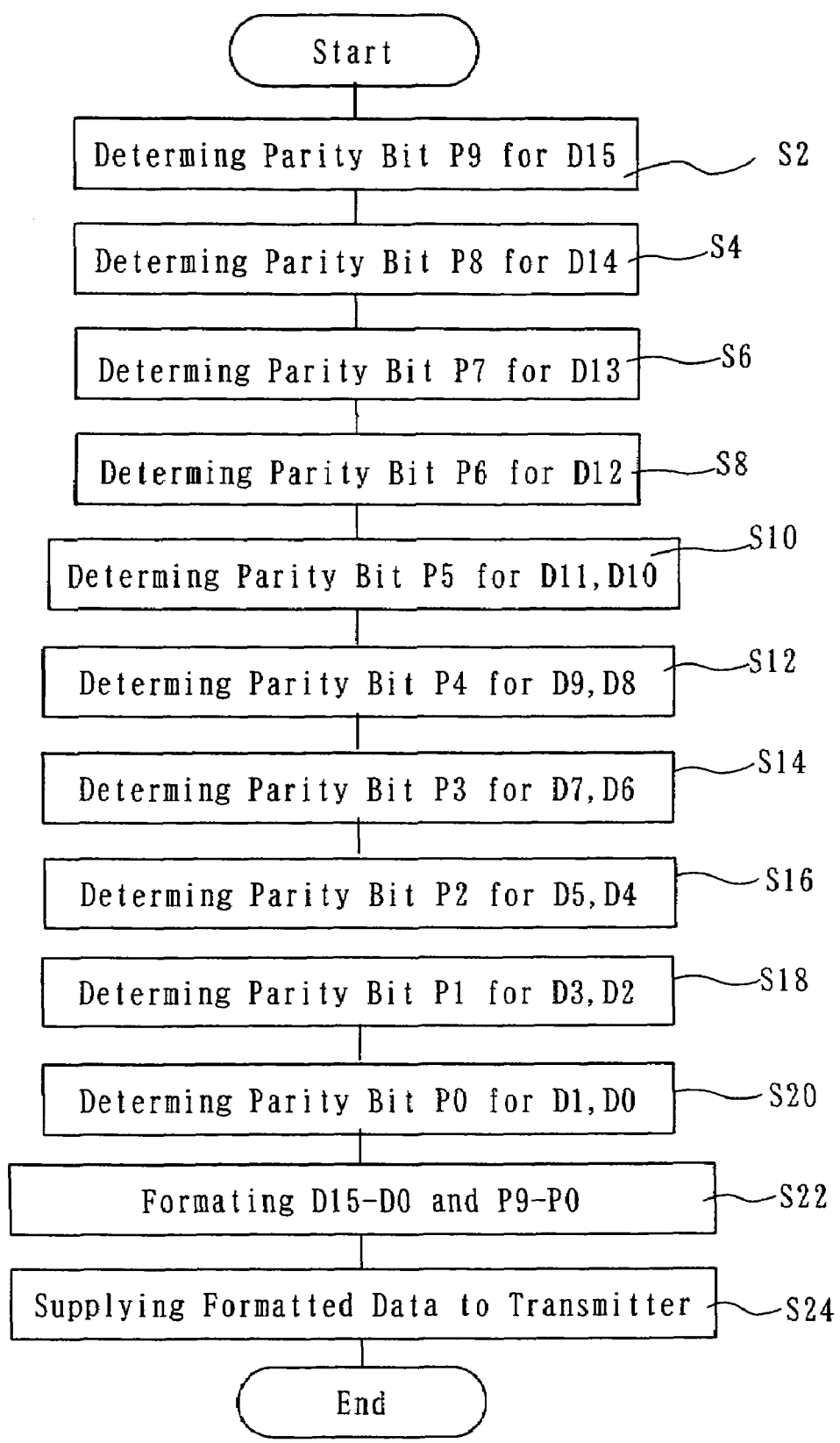
FIG. 3 is a flow chart of operation of the encoder of the transmitter of FIG. 1.
Figure 4:
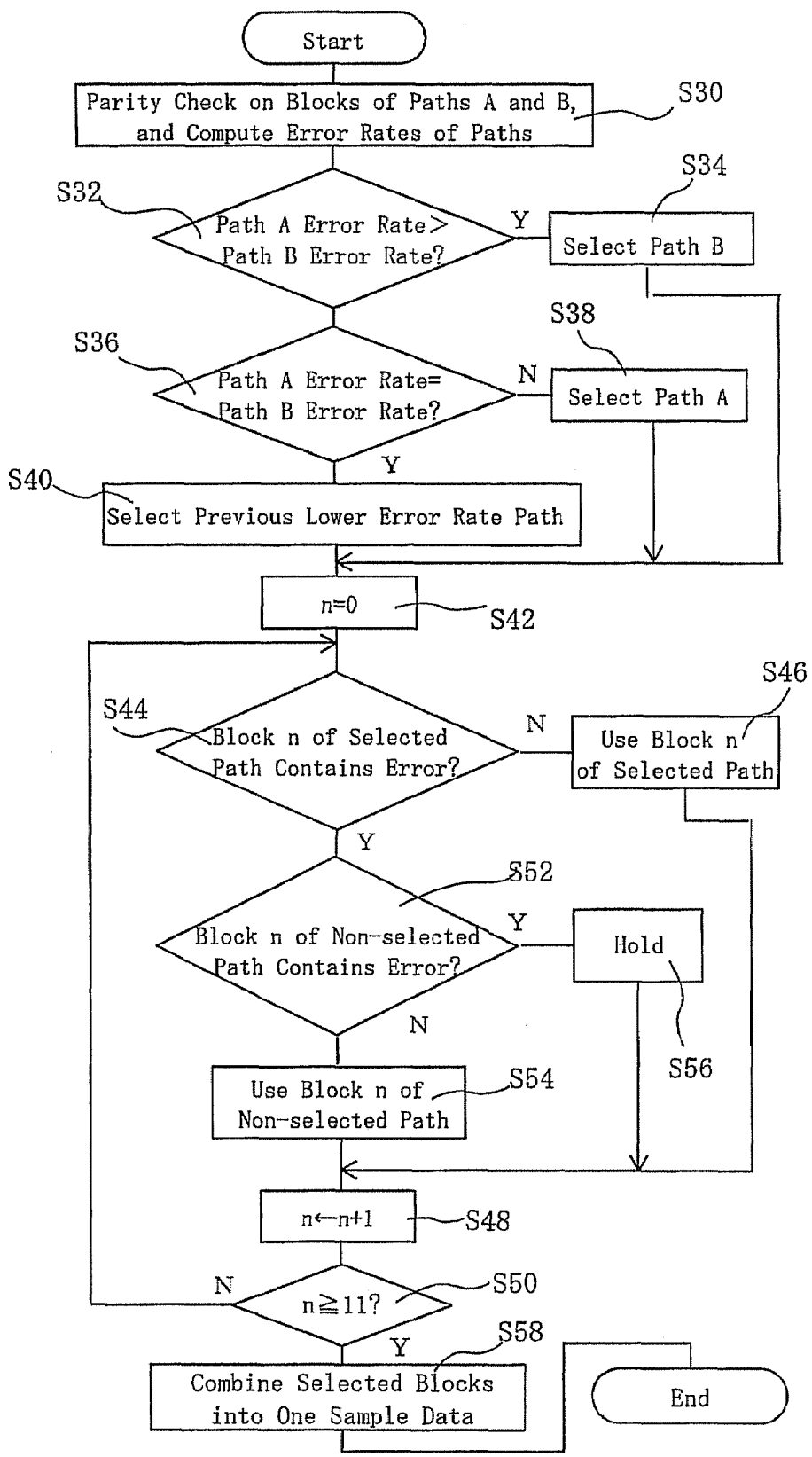
FIG. 4 is a flow chart of operation of an example of a decoder of the receiver of FIG. 1.

Now, the encoding performed in the encoder 6 is described with reference to FIGS. 2a through 2c and 3. FIG. 2a shows a 16-bit digital audio signal from the A/D converter 4. A bit D15 of the 16-bit digital audio signal is a most significant bit (MSB), and a bit D0 is a least significant bit (LSB). The bit D15 is used as a sign bit. The digital audio signal is divided into ten (10) blocks. Specifically, each of four bits D15, D14, D13 and D12 individually forms one block, and adjacent two of bits D11, D10, D9, D8, D7, D6, D5, D4, D3, D2, D1 and D0 form respective blocks. Less bits are used to form one block in higher-order bit portions of the digital audio signal.

As shown in FIG. 2b, a parity bit is attached to each block. Specifically, a parity bit P9 is attached to the bit D15. The bit D14 is provided with a parity bit P8, the bit D13 is provided with a parity bit P7, and the bit D12 is provided with a parity bit P6. A parity bit P5 is attached to the two bits D11 and D10, a parity bit P4 to the two bits D9 and D8, a parity bit P3 to the two bits D7 and D6, a parity bit P2 to the two bits D5 and D4, a parity bit P1 to the two bits D3 and D2, and a parity bit P0 is attached to the two bits D1 and D0.

The value of each parity bit is chosen in such a manner that the sum of the sum of "1" in an associated block and the parity bit is odd (1) or even (0). In the illustrated example, the value of each parity bit is chosen to provide the sum which is even. That is, the even parity system is employed.

When a block with a parity bit added to it is received, ones of the bits in that block and the parity bit attached to that block, having "1" are counted. If the total number of the bits having "1" is an even number, that block is proved to have been sent with no error. Like this, by dividing a digital audio signal into plural blocks and attaching a parity bit to each of the blocks, it is not necessary to discard the entire digital audio signal if part of the digital audio signal contains error, but it is sufficient to discard only that block containing error.

One may consider adding one parity bit to one 16-bit digital audio signal. In such a case, however, if error occurs either in consecutive or non-consecutive bits, the occurrence of error can be detected if error occurs in an odd number of bits, but the occurrence of error in an even number of bits cannot be detected. Accordingly, in order to reduce occurrence of error in plural bits as much as possible, one digital signal is divided into a plurality of blocks so that the number of information bits for one parity bit can be small.

Higher-order bits in the digital audio signal play important part. For example, the bit D15, which is the sign bit, indicates whether the digital audio signal is positive or negative. The bit D14 indicates the presence or absence of the level of one-half of the maximum level of the digital audio signal. Similarly, the bit D13 indicates the presence or absence of the level of one-quarter of the maximum level, and the bit D12 indicates the presence or absence of the level of one-eighth of the maximum level. If error in any of these bits is not detected, the sound quality will be significantly affected. This is the reason that one block is formed by one bit in the higher-order portion of the digital audio signal so that they can be individually inspected for error.

In this manner, error detecting accuracy can be improved by dividing one digital audio signal into a plurality of blocks and attaching a parity bit to each block.

FIG. 2c shows a signal format for transmission including blocks with associated parity bits. In this format, the four blocks formed by the respective ones of the higher-order bits D15-D12 are disposed consecutively, and the parity bits P9-P6 for these blocks are disposed consecutively at locations, i.e. at lower-order positions, spaced from the associated blocks. The six blocks formed by the lower-order bits D11-D0 with their associated parity bits P5-P0 are consecutively disposed between the bits D15-D12 and the bits P9-P6.

The reason why the parity bits P9-P6 for the higher-order bits D15-D12 are spaced from the associated higher-order bits is as follows. If the higher-order bits D15-D12 and the parity bits P9-P6 were consecutively transmitted, error may possibly occur in consecutive ones of these bits, which results in erroneous judgment as if bits, which actually contain error, contained no error. Possibility of erroneous detection in such consecutive occurrence of error can be reduced by disposing the parity bits P9-P6 at locations spaced from the associated higher-order bits D15-D12. Since the higher-order bits have a significant influence on the sound quality as described above, the spacing is disposed in order to prevent erroneous detection. Needless to say, the parity bits for the remaining blocks may be spaced from the associated blocks.

The parity bit determination and the formatting are performed in the encoder 6. The encoder 6 includes, for example, a CPU or a DSP, which operates in a manner as shown in the flow chart of FIG. 3. The values of the parity bits P9-P6 for the bits D15-D12 are determined (Steps S2, S4, S6, S8). Similarly, the value of the parity bit P5 for the bits D11 and D10, the value of the parity bit P4 for the bits D9 and D8, the value of the parity bit P3 for the bits D7 and D6, the value of the parity bit P2 for the bits D5 and D4, the value of the parity bit P1 for the bits D3 and D2, and the value of the parity bit P0 for the bits D1 and D0, are determined (Steps S10, S12, S14, S16, S18, S20). How to determine the values of these parity bits is known, and, therefore, no detailed description is made. The bits D15-D0 and their parity bits P9-P0 are formatted into the format shown in FIG. 2c (Step S22), and supplied to the transmitting unit 8 (Step S24).

Now, referring to FIGS. 4 and 5a through 5d, the decoder 20 is described. As described previously, the decoder 20 is supplied with mutually corresponding coded signals from the tuning units 18A and 18B. The decoder 20 includes, for example, a CPU or a DSP and memory means, for example, a memory, and operates in a manner as shown in the flow chart of FIG. 4.

First, the parity check is performed on the respective blocks of the corresponding coded signals supplied from the tuning units 18A and 18B (hereinafter referred to as path A and path B, respectively), and error rates of the two paths are computed (Step S30). The parity check is carried out by, when the even parity check is employed, computing an exclusive logic sum (EXOR) of the bits in the block to be checked and the associated parity bit. If the answer is "0", the block is judged to contain no error, and if the answer is "1", the block is judged to contain error.

Now, let it be assumed that the coded signal of the path A is as shown in FIG. 5b, and the coded signal of the path B is as shown in FIG. 5c. The blocks with a mark X attached above them are blocks which are judged to contain error. The path A coded signal includes ten (10) blocks, and four (4) of them contain error. Accordingly, the error rate (i.e. the number of blocks with error/the total number of blocks) is 4/10. Three (3) out of ten (10) blocks of the path B coded signal contain error, and, therefore, the error rate of the path B signal is 3/10.

Next, whether the computed error rate of the path A is greater than the error rate of the path B is judged (Step S32). If the answer is YES, the path B coded signal having a smaller error rate is selected (Step S34). If the answer to the question made in Step S32 is NO, whether the error rates of the paths A and B are equal or not is judged (Step S36). If the answer is NO, which means that the error rate of the path A is smaller than the error rate of the path B, the path A coded signal is selected (Step S38). If the answer to the question made in Step S36 is YES, which means the error rates of the paths A and B are equal, the coded signal of the path A or B, of which the preceding coded signal had a smaller error rate, is selected (Step S40). This selection is based on the understanding that without substantial changes in the transmission conditions, the path that previously exhibited a lower error rate is more reliable. It is arranged such that, when the error rates of the preceding coded signals of the paths A and B are equal, the default path may be selected, or the previously selected path may be selected. Alternatively, not only the just preceding result but also past results may be taken into consideration and the path exhibiting lower error rate more times than the other may be selected.

In this manner, the path to be employed is determined. In the example illustrated in FIG. 5, the path B has a smaller error rate, and, therefore, the path B is selected. Since the preceding error rate is to be used in Step S40, the error rates of the two paths are stored in the memory in Step S30. If the previously selected path is to be selected when the current error rates of the two paths are equal, each time either one of the paths is selected the currently selected path is stored for the next use.

After an appropriate one of the paths is selected in one of Steps S34, S38 and S40, the count in a counter n for use in designating the respective blocks of the selected path is made zero (0) (Step S42). Let the block of D0 and D1 and the block of D2 and D3 be called Block 0 and Block 1, respectively. Let the remaining blocks be similarly referred to, so that the block of D15 can be referred to as Block 10. The blocks may be called conversely so that the block of D15 may be called Block 0.

Next, a question is made as to whether or not Block n designated by the counter n in the selected path, contains error (Step S44). If the answer is NO, Block n is decided to be used as it is (Step S46). Then, the count in the counter n is incremented by one (1) (Step S48). A judgment is made whether the count in the counter n is eleven (11) or greater, which is greater than the total number, ten (10), of the blocks (Step S50). If the count is smaller than eleven (11), the procedure is executed again from Step S44. In this manner, in the selected path, the blocks judged not to contain error can be successively decided without delay.

In the examples shown in FIGS. 5b and 5c, the path B is selected. Since the block of D14, the block of D12, the block of D11 and D10, the block of D9 and D8, the block of D5 and D4, the block of D3 and D2, and the block of D1 and D0 are free of error, they are decided for use when they are designated by the counter n, as shown in FIG. 5d.

The answer of YES in the judgment made in Step S44 means that Block n in the selected path contains error. Then, judgment is made as to whether the corresponding Block n in the non-selected path contains error or not (Step S52). If Block n of the non-selected path is judged to be free of error, that Block n of the non-selected path is used (Step S54).

In the example shown in FIG. 5, the block of D15 of the selected path B contains error as shown in FIG. 5c, while the block of D15 of the non-selected path A does not contain error. Accordingly, as shown in FIG. 5d, the use of the block of D15 of the path A is decided. The block of D7 and D6 of the path B, too, contains error, while the block of D7 and D6 of the path A does not contain error. Therefore the use of the block of D7 and D6 of the path A is decided.

If, in Step S52, both paths are judged to contain error, the block of neither path can be used, and, therefore, holding is carried out (Step S56). Specifically, the corresponding block of the last outputted digital audio signal from the decoder 20 is read out from the memory and is used as a substitute for the error containing block. Since the signal is a digital audio signal, it can be considered that there is little difference between the previous digital audio signal and the current digital audio signal. In addition, what is substituted for is only a block, the substitution has little influence on the sound quality.

For example, as shown in FIG. 5c, the block of D13 of the selected path B contains error, and the block of D13 of the non-selected path A also contains error as shown in FIG. 5b. In such a case, it is decided to use the corresponding block of D13 of the previously outputted digital audio signal shown in FIG. 5a, as shown in FIG. 5d.

Following Step S54 or S56, Steps S48 and S50 are performed. When all of the blocks are examined in this manner, the result of the judgment made in Step S50 becomes YES. Then, the blocks the use of which has been decided are combined into a single digital audio signal like the one shown in FIG. 5d, which, then, is outputted. The digital audio signal thus formed is stored in the memory because it may or may not be used in Step S56 when the next digital audio signal is to be formed.

Figure 6:
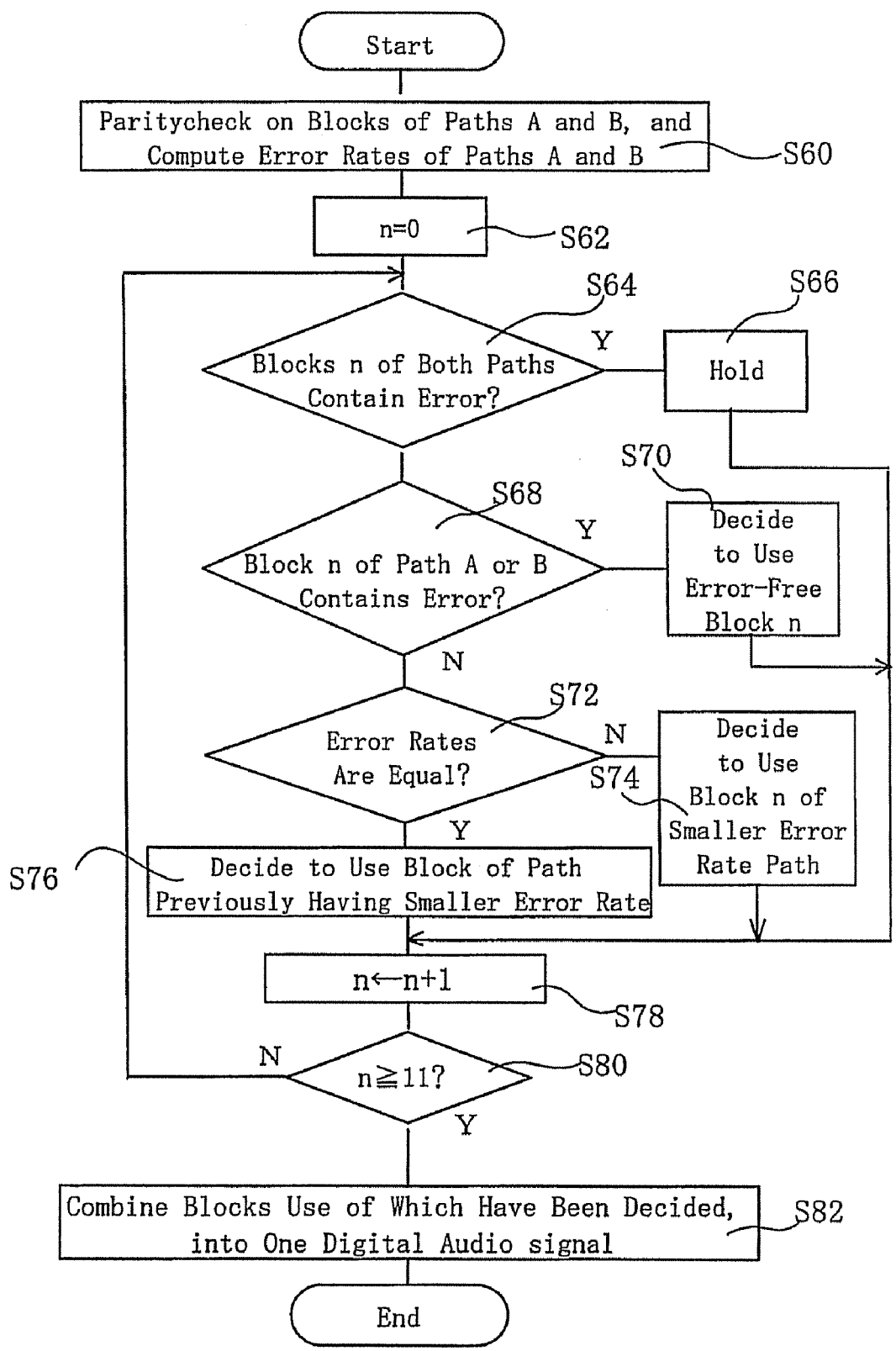
FIG. 6 is a flow chart of operation of another example of the decoder of the receiver of FIG. 1.

The decoder 20 may be so arranged to operate as shown in FIG. 6, for example. First, the blocks of the paths A and B are subjected to parity check to determine the error rates of the two paths (Step S60). Then, the count in the counter n, which designates blocks of the paths, is made zero (0) (Step S62).

Judgment is made as to whether Blocks n of the paths A and B designated by the counter n contain error (Step S64). If the answer is YES, i.e. if both blocks are judged to contain error, holding operation as done in Step S56 is carried out (Step S66).

If the answer to the query in Step S64 is NO, judgment as to whether or not either one of the paths A and B contains error is made (Step S68). If the answer is YES, it is decided that Block n free of error is to be used (Step S70). If the answer is NO, which means neither block contains error, judgment is made as to if the error rates determined in Step S60 are equal to each other (Step S72). If the answer is NO, which means that the error rates are not equal, it is decided that Block n of the path whose error rate is smaller is to be used (Step S74). If the answer to the question made in Step S72 is YES, which means that the error rates are the same, it is decided that Block n of the path which had a lower error rate in the previous time is to be used (Step S76). If the error rates of the paths in the previous time were equal, the default path is selected, or the previously selected path is selected.

Following Step S66, S70, S74 or S76, the count in the counter n is incremented by one (1) (Step S78). Then, judgment is made as to whether the count in the counter n is greater than ten (10), which is the total number of the blocks, i.e. equal to eleven (11) or larger (Step S80). If the answer is NO, the procedure is executed again from Step S64. When the answer to the question made in Step S80 becomes YES, which means that all of the blocks to be used have been decided, the blocks decided for use are combined into a single digital audio signal (Step S82).

Parity check can find error, but it cannot correct the error. The receiver according to the invention corrects error, using corresponding coded signals from the two tuning units. In the decoder 20 of the receiver, when the parity check indicates error in a block in one path, the corresponding block free of such error in the other path is substituted for the error containing block, and, therefore, the correction accuracy is high. If the corresponding block in the other path contains error, too, the previously used digital audio signal block is used for error correction, and, therefore, no block dropout occurs.

In the above-described example, the even parity is employed, but the odd parity can be employed instead. In the above-described example, one digital audio signal has been described as comprising sixteen (16) bits, but the number of the bits is not limited to it. Also, in the above-described example, an arrangement of forming one block by one bit is employed only for higher-order bits, but such arrangement can be employed for all bits, from higher-order to lower-order bits, in case that the number of the parity bits can be increased. In the illustrated embodiment, what is coded and transmitted is a digital audio signal. The signal, however, is not limited to an audio signal, but other analog signal source may be used. For example, an analog detection signal from a sensor or the like may be digitized, and, further, encoded in the encoder 6 before transmission. A plural-bit digital signal from other digital device may be encoded by the encoder 6 and transmitted. Although two tuning units are used in the illustrated embodiment, more tuning units may be used. In this case, the block to be used is determined by checking the corresponding blocks of the coded signals from the respective tuning units for error.

INDUSTRIAL UTILITY

According to the present invention, in a digital wireless transmission, error can be detected with a high accuracy, and code error correction can be reliably done without decreasing the communication efficiency. The present invention can be embodied, for example, in a digital wireless microphone.

The invention claimed is:

1. A receiver comprising:
a plurality antennas and tuning units for receiving and demodulating respective modulated signals each corresponding to a transmitted signal comprising a carrier modulated with a coded signal to thereby provide a plurality of corresponding demodulated coded signals, said coded signal comprising a digital signal train comprising a plurality of successive digital signals resulting from A/D conversion of an analog input signal, each of said digital signals comprising a plurality of bits arranged from a most significant bit to a least significant bit and including a higher-order bit and a lower-order bit therein, each of said digital signals being divided into a plurality of blocks arranged from a highest-order block, which includes the most significant bit, to a lowest-order block, which includes the least significant bit, the number of the bits in the highest-order block including the most significant bit being smaller than the number of the bits in the lowest-order block including the least significant bit, the number of the bits in each block of each digital signal being smaller than or equal to an adjacent lower-order block, each of said blocks having a parity bit attached thereto;
parity check means to which said demodulated coded signals outputted from said plurality of demodulating means are inputted, said parity check means making a parity check on respective ones of said blocks of said demodulated coded signals;
selecting means for selecting, from each set of corresponding blocks in said demodulated coded signals outputted from said plurality of demodulating means, a block judged to be error-free from the result of the parity check made by said parity check means;
combining means for combining the blocks selected by said selecting means into one digital signal and outputting the one digital signal, wherein said combining means outputs successive combined digital signals corresponding to successive digital signals from said digital signal train; and
memory means for storing therein a last one of said combined digital signals successively outputted from said combining means,
said selecting means, when said parity check means judges that all of the corresponding blocks in each set contain error, selecting the corresponding block of said last one of said combined digital signals stored in said memory means.

2. A receiver comprising:
a plurality of antennas and tuning units for receiving and demodulating respective modulated signals each corresponding to a transmitted signal comprising a carrier modulated with a coded signal to thereby provide a plurality of corresponding demodulated coded signals, said coded signal comprising a digital signal train comprising a plurality of successive digital signals resulting from A/D conversion of an analog input signal, each of said digital signals comprising a plurality of bits arranged from a most significant bit to a least significant bit and including a higher-order bit and a lower-order bit therein, each of said digital signals being divided into a plurality of blocks arranged from a highest-order block, which includes the most significant bit, to a lowest-order block, which includes the least significant bit, the number of the bits in the highest-order block including the most significant bit being smaller than the number of the bits in the lowest-order block including the least significant bit, the number of the bits in each block of each digital signal being smaller than or equal to an adjacent lower-order block, each of said blocks having a parity bit attached thereto;
parity check means for making a parity check on respective ones of said blocks of said demodulated coded signals;
error rate detecting means for detecting an error rate of each of said demodulated coded signals from the results of said parity check;
selecting means for selecting one of said demodulated coded signals which said error rate detecting means judges to have a lower error rate;
substituting means for substituting, for a block of said demodulated coded signal selected by said selecting means which said parity check means judges to contain error, a corresponding block in another demodulated coded signal which is judged to be error-free, to thereby output said demodulated coded signal selected by said selecting means with said substituted error-free block as one digital signal, wherein said substituting means outputs successive combined digital signals corresponding to successive digital signals from said digital signal train; and memory means for storing therein a last one of said combined digital signals successively outputted from said substituting means, said substituting means, when said parity check means judges that said corresponding block in said another demodulated coded signal also contains error, substituting a corresponding block of said last one of said combined digital signals stored in said memory means for said block in said another demodulated coded signal which said parity check means judges to contain error.

* * * * *

UNITED STATES PATENT AND TRADEMARK OFFICE
CERTIFICATE OF CORRECTION

PATENT NO. : 7,551,690 B2
APPLICATION NO. : 10/467847
DATED : June 23, 2009
INVENTOR(S) : Takako Shibuya and Tomohisa Tanaka It is certified that error appears in the above-identified patent and that said Letters Patent is hereby corrected as shown below:

In Claim 1, Column 9, line 52, delete "a plurality antennas" and insert therefor --a plurality of antennas--.

Signed and Sealed this

Eleventh Day of August, 2009

David J. Kappos
*Director of the United States Patent and Trademark Office*